Sept. 2, 1958 — H. H. BLOSJO — 2,849,876
HARDNESS TESTING DEVICE
Filed March 30, 1953 — 4 Sheets-Sheet 2
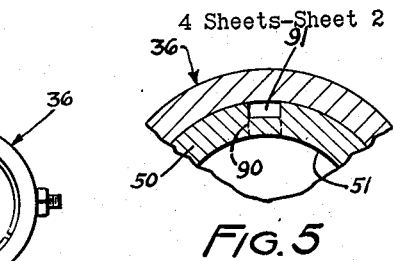
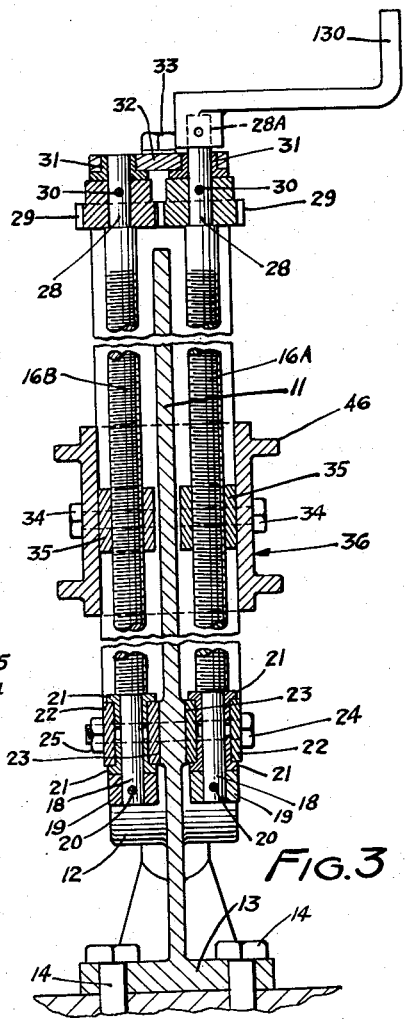
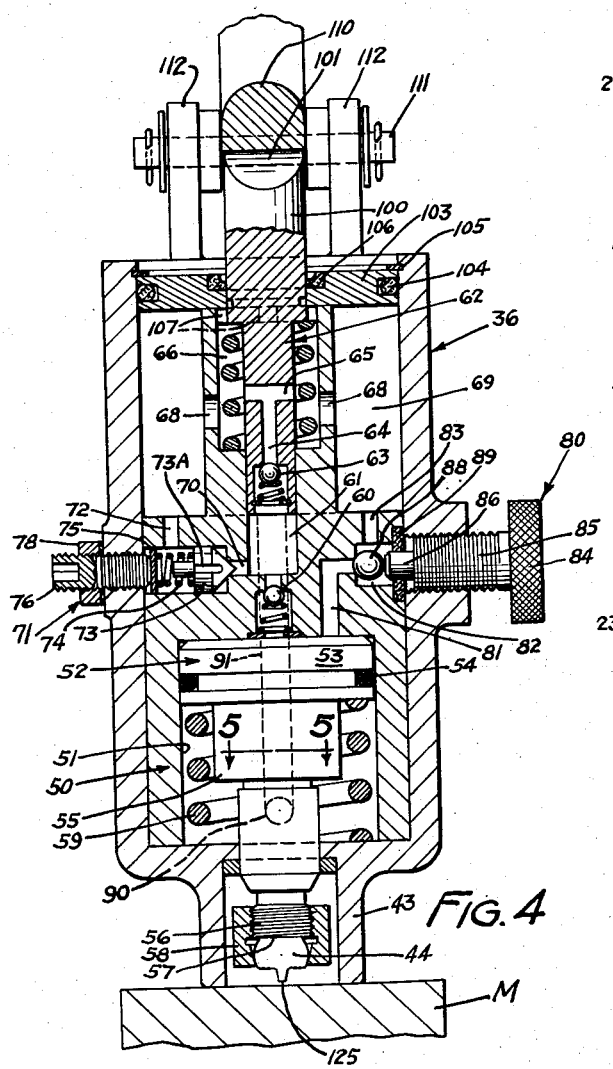
INVENTOR.
HERBERT H. BLOSJO
BY
ATTORNEYS Sept. 2, 1958          H. H. BLOSJO          2,849,876

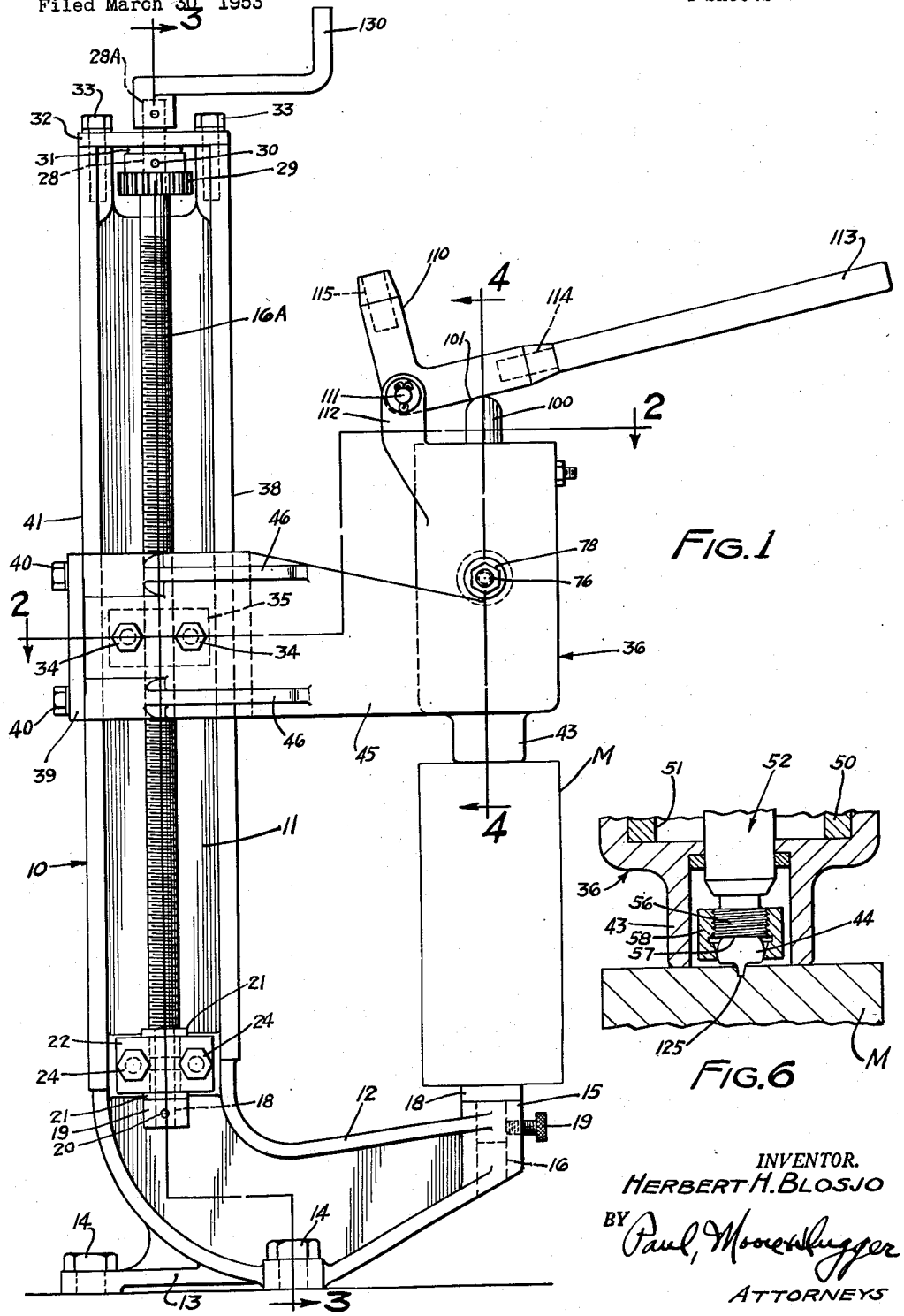

HARDNESS TESTING DEVICE

Filed March 30, 1953          4 Sheets-Sheet 3

INVENTOR.
HERBERT H. BLOSJO
BY
ATTORNEYS

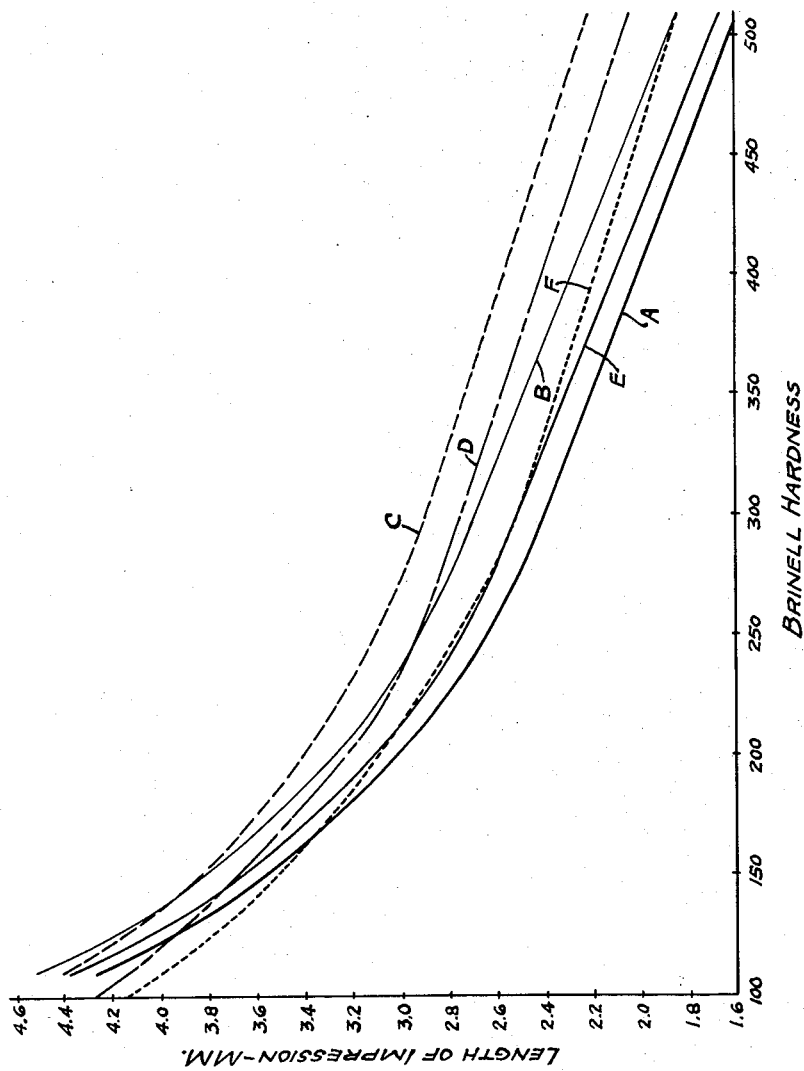

United States Patent Office 2,849,876
Patented Sept. 2, 1958

2,849,876

HARDNESS TESTING DEVICE

Herbert H. Blosjo, Minneapolis, Minn.

Application March 30, 1953, Serial No. 345,361

6 Claims. (Cl. 73—81)

This invention relates to new and useful improvements in a hardness testing device and particularly to new and useful improvements in a portable hardness testing device adapted to grip the material to be tested between opposed jaws thereof.

This invention relates to improvements in a hardness testing device for testing the hardness of material according to the Brinell method in which a hardened steel penetrator or indentation member is pressed against the sample of the material to be tested and the hardness of the material being tested is then determined by measuring the indentation made by the penetration member under a predetermined pressure.

It is an object of this invention to provide a new and unique hardness testing device adapted for gripping the material to be tested between opposed jaws thereof;

It is a further object of this invention to provide a compact inexpensive and facile portable hardness testing device;

Another object of this invention is to provide a hardness testing device having a stationary jaw and a movable jaw whereby the work being tested may be securely and immovably positioned therebetween;

It is still a further object of this invention to provide a hardness testing device having a work engaging member within which a penetrator is adapted to be reciprocated from work engaging position to retracted position;

Still a further object of this invention is to provide a hardness testing device having an operating member which may be operated from a plurality of positions;

Still a further object of this invention is to provide a hardness testing device which may be used with work of various shapes and configurations;

Still a further object of this invention is to provide a hardness testing device having a frame with a stationary jaw supported thereon and efficient means for traversing a movable indentation member carrying head to and from said stationary jaw for engaging work to be held therebetween;

Still a further object of this invention is the provision of a new and useful indentation member having unique configuration;

Still another object of this invention is to provide a new and unique indentation member adapted to provide a readily discernable and measurable indentation in the material being tested;

Other and further objects of this invention reside in the constructional features of the frame, in the penetrator or indentation member carrying head and means for advancing or retracting the same; and in the constructional details of the penetrator carrying head and hydraulic means therein;

Still other and further objects of the invention are those inherent and apparent in the apparatus as described, pictured and claimed.

This invention will be described with reference to the drawings in which corresponding numerals refer to the same parts and in which:

Figure 1 is a side elevational view of the instant invention;

Figure 2 is a horizontal sectional view taken along the line and in the direction of the arrows 2—2 of Figure 1;

Figure 3 is a vertical sectional view taken along the line and in the direction of the arrows 3—3 of Figure 1;

Figure 4 is a vertical sectional view taken through the indentation member carrying head of Figure 1, along the line and in the direction of the arrows 4—4 of that figure;

Figure 5 is a fragmentary horizontal sectional view taken along the line and in the direction of the arrows 5—5 of Figure 4 through the indentation member carrying head and illustrating the return port for hydraulic fluid;

Figure 6 is an enlarged fragmentary vertical sectional view of the indentation member carrying head in position upon the material being tested;

Figure 11 is a graph showing the length of impression produced by various embodiments of my indentation member for Brinell hardness numbers.

Figure 7:
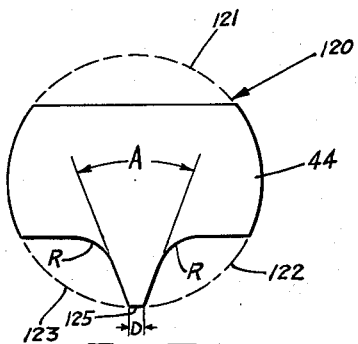
Figure 7 is an elevational view of the new and improved indentation member.

Referring now to the drawings and particularly to Figure 1, there is illustrated a hardness testing device generally designated 10 having a shape essentially that of a C-clamp. It is provided with a frame member 11 having an I-beam cross-section which is connected to an inturned base end 12 to which is attached a pad 13 which may be mounted upon a bench by means of cap screws 14.

It may be mentioned at this time that it is contemplated that my invention may be used in stationary position upon a bench in which instance a plurality of cap screws 14 is inserted through pad 13 to secure the hardness testing device 10 to the bench or it may be removed therefrom and utilized upon various types of work in the manner of a C-clamp.

Base end 12 is provided with an integral boss 15 which is apertured at 16 for receiving hardened pad 18 which is held in position by means of a threaded screw 19.

In the recess formed in each part of the I-beam section 11 there is positioned threaded screws 16A and 16B; one on each side. These screws are adequately supported on each end, the lower end being provided with thrust bearings 21 positioned by plates 22 against machined surfaces 23 and securely held in position by cap bolts 24 having nuts 25 thereon.

The upper ends of each of the threaded screws 16A 16B is provided with a reduced portion 28 upon which is seated a spur-gear 29 pinned thereto by pin 30. Adjacent the reduced portion of the spur-gear 30, the reduced portions 28 of threaded members 16A and 16B are inserted in flange bearings 31 which are positioned in cap member 32, which is in turn maintained in position by cap bolts 33. One of the screws 16A and 16B is right hand, and the other is left-hand, and it is contemplated that in actual production these screws will be half-inch stock with an Acme thread. The upper end of one of them (in this case 16A) is provided with an extending portion 28A.

Cap screws 34 are connected to threaded blocks 35 one of which is positioned by each of threaded members 16A and 16B and serve to anchor them securely to movable member generally designated 36.

The movable member 36 has a sliding surface at 37 operating on the milled surface 38 of the member 11 and a cap plate 39 which likewise operates on the milled surface 41 of the member 11. In this manner the member 36 is adjusted upwardly and downwardly.

The member 36 is provided with a circular guard or head 43 in which is positioned for reciprocation the indentation member 44. A pair of supporting webs 45 serve to support this indentation member carrying head 43 from the I-beam cross-section 11 and a pair of stiffening webs 46 are provided on member 36 adjacent each side of the I-beam cross-section 11.

Referring now to Figure 4, the member, generally designated 36, is a hydraulic jack unit, and is provided with shell or indentation member carrying head 43 which is brought into contact with the work by means of the screws 16A and 16B and the work is thus clamped between member 43 and the member 18. During this condition the indentation member 44 is retracted within the head 43.

Within the member 36 there is an inner member generally designated 50 having a cylindrical portion at 51 within which the piston generally designated 52 operates. Piston 52 comprises a head 53 adjacent which is provided a seal 54. Piston 52 is provided with a plunger 55 having a reduced threaded portion 56, having a flat surface 57 on which the indentation member 44 is clamped by means of a threaded cap 58. A compression spring 59 normally contacts the underside of the piston head 53 to bias it to the full-line position shown best in Figure 4 wherein the indentation member is retracted within the head 43.

The member 50 is provided with a check valve at 60 which leads to another cylinder 61 in which a second piston generally designated 62 operates. The piston 62 likewise carries a valve 63 communicating through passageway 64 and 65 to the chamber space 66 which in turn communicates through passageway 68 to space 69 in which oil or other hydraulic fluid is contained. From the cylinder 61 another passageway 70 communicates with the over-pressure relief valve generally designated 71 and thence through the passageway 72 to the oil supply reservoir or chamber 69.

Thus, relief valve 71 comprises a conical head 73 having an axial channel 73A therein. Head 73 is biased in the rightward direction with reference to Figure 4 by a spring 74 which engages a small washer or plate positioned on the underside of the adjustment screw 76. Screw 76 may be locked in any position by tightening of lock nut 78.

Over-pressure valve 71 is regulated so that only a certain amount of pressure can be built up against the piston 52.

A release valve is provided, generally designated 80, which when screwed outwardly allows oil to flow through the passage 81, through passage 82 and thence from passage 83 into chamber 69. The valve is provided with a knurled thumb-wheel 84 to which is connected the threaded shank 85 having a reduced portion 86 which contacts a valve-ball 88. As the knurled wheel 84 is manipulated, portion 86 may be drawn rightwardly with reference to Figure 4 to release the contact of sphere 88 with passageway 81 and thus allow the hydraulic fluid to flow from passage 81 through chamber 82 to passage 83, or the knurled wheel 84 may be manipulated to impose reduced portion 86 against ball 88 and thus to close off passageway 81. Positioned around the reduced portion 86 as shown best in Figure 4 is a seal 89.

Shown best in dotted lines in Figure 4 is a port 90 in member 50 which communicates with a groove 91, shown in Figure 5, which is cut in the outside of the member 50 back up to the reservoir 69 so that the oil which fills the space under the piston head 53 is pushed out and up into the reservoir 69 as the piston 52 is pushed down.

Piston member 62 is provided with an actuator end 100 having an arcuate surface 101 at the exterior end thereof. Member 100 is provided with an enlarged flange portion in which is provided apertures 107 shown best in Figure 4. A keeper ring 103 is positioned at the top of member 36 and secured thereto by a conventional split ring 105. Ring 103 is provided with an annular oil seal 104 which contacts member 36 and a second annular oil seal 106 which contacts member 100.

The provision of apertures 107 allows member 100 and piston 62 to descend or ascend in member 36, without restriction from hydraulic pressure.

The movement of member 100 and piston 62 is by means of bellcrank member 110 having a plurality of apertures 114 and 115. The bellcrank member 110 is pivoted at 111 to upending ears 112 and engages the arcuate surface 101 of piston 62.

Handle 113 may be inserted in either one of apertures 114 or 115 for the operation of actuator member 100. Thus, it may be seen that the bellcrank 110 may be operated from a plurality of positions: (1) the position in which the handle 113 is in aperture 114, and (2) a second position in which the handle 113 is in aperture 115. This allows for manipulation in cramped spaces.

Thus, it may be seen that the member 36 may, by rotation of handle 130 and consequent rotation of threaded member 16A and 16B, be adjusted upwardly or downwardly so as to bring the head 43 to or from the material being tested so as to clamp the material as shown in Figure 1. The material M being tested may be of any shape, and may be brought to the hardness tester as where the tester is mounted on a bench, or the tester may be brought to the material. Where rounds are being tested, the member 18 may be provided with a milled groove so as to prevent its turning and other types of pads 18 may be substituted, as for example, a pointed pad so as to keep the work from shifting, a slightly rounded pad for working on an irregular surface, etc.

The movement of the piston 62 by means of actuator end 100 being operated by the bellcrank member 110 through handle 113 will move fluid through check valve 60 against piston head 53 and hence push the indentation member 44, which is provided with an extending land 125 from its position of protection within the head 43 and consequently into the material M.

Referring now specifically to Figures 7–11, and immediately to Figures 7–10, there is shown my new and unique penetrator. This penetrator comprises a sphere generally designated 120 at the top of which a portion 121 is ground away to form a flat surface. Opposite the flat surface produced by the grinding away of portion 121, portions 122 and 123 are ground away to provide a land having a center width dimension D and a radius R. As may be seen best with reference to Figure 8, the dimension D is the smallest at the center of the land and gradually increases in width to the ends thereof. This indentation member 44 is provided with the land 125 by the grinding off of a sphere of hardened steel, stellite, tungsten carbide, or other carbide, heat-treated chrome steel or other hardened material.

It has been found that this penetrator will operate extremely satisfactory with 500 kilograms pressure for materials having a hardness equal to 100 Brinell hardness and up to 500 Brinell hardness. For hardnesses less than 100 Brinell, the indentation member may be replaced by a conventional spherical ball but the pressure will be maintained at the same 500 kilogram level.

In the preferred embodiment of my penetration member, the angle A or the angle between the inclined surfaces of the land 125 comprises a 60° angle and the dimension D comprises .015 inch. However, it is to be understood that the angle A may vary between 30° and 90° and the dimension D may vary between .010 inch and .030 inch without departing from the spirit and scope of this invention. The width of the ends of the land 125 increases from the center toward each end thereof, as shown best in Figure 8, and it is approximately 2½–3 times the width of dimension D at the ends thereof. The sphere 120 having a diameter of .3937 inch plus or minus .0002 inch has a portion 121 ground off to a depth of .075 plus or minus .003 inch. The ground-off portion 121 provides a plane at right angles to a plane passed through the center of the sphere and through the center of the land 125.

Figure 9:
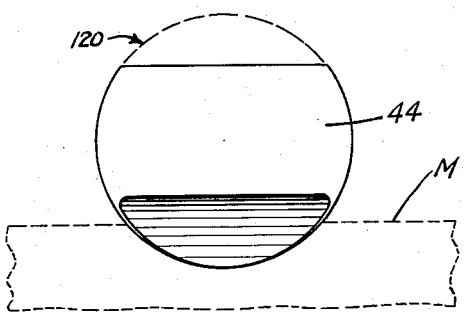
Figure 9 is an elevational view showing the indentation member in position on the material being tested.
Figure 8:
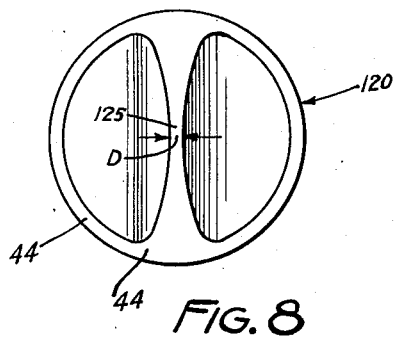
Figure 8 is a bottom view of the indentation member of Figure 7.
Figure 10:
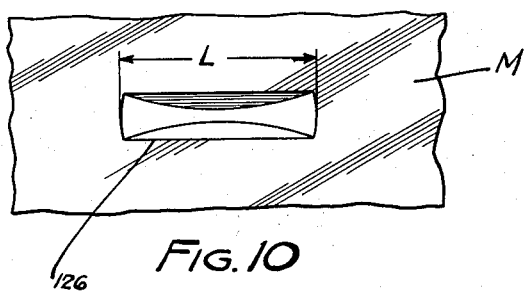
Figure 10 is a plan view of the material showing the indentation left thereby.

Turning now specifically to Figures 9 and 10, the penetration member 44 is shown in Figure 9 penetrating into the material M. In Figure 10 is shown the indentation 126 left by the land 125 of penetration member 44 having a length L.

Turning now specifically to Figure 11, there is shown a series of curves A—F which show the lengths of impressions in millimeters produced by various lands 125 per Brinell hardness number.

Thus, in Figure 11, the curve A is produced by land 125 having an angle A of 40° and a dimension D of .020 inch.

Curve B is produced by a penetration member 125 having an angle A of 40° and a dimension D of .015 inch.

Curve C is produced by a land 125 having an angle A of 50° and a dimension D of .008 inch.

Curve D is produced by a penetration member 125 having an angle A of 70° and a dimension D of .010 inch.

Curve E is produced by a penetration member 125 having an angle A of 40° and a dimension D of .018 inch.

Curve F is produced by a penetration member 125 having an angle A of 60° and a dimension D of .015 inch.

As many widely differing embodiments of this invention may be made without departing from the spirit and scope thereof, it is to be understood that I do not specifically limit myself to the embodiment disclosed herein.

What I claim is:

1. A hardness testing device comprising in combination a supporting member providing a central web and having an extending end, a pair of threaded members positioned one on either side of said central web, each of said threaded members having a cooperating gear thereon, one of said threaded members being provided with handle means, a movable member carried by said threaded members and movable into position to engage work being tested between said extending end and said movable member, indentation means carried thereby and for engaging the surface of said material, and means for reciprocating said indentation means.

2. A hardness testing device comprising in combination a stationary member having a portion adapted to engage the material being tested, a guard member movable on said stationary member for clamping the material being tested therebetween, an indentation member movable from completely retracted position within said guard to extended position wherein it is in engagement with said material being tested and means for moving said indentation member comprising a reciprocal actuator means having a first or pump pistion connected thereto and a second pistion carrying said indentation member movable in response to the actuation of said first piston.

3. In combination, a stationary member having opposed spaced parallel and vertically extending flanges joined by an integral web, said stationary member having a portion providing an anvil, a movable member slidably retained on said vertically extending flanges and having a work engaging portion movable toward and away from said anvil for gripping material to be tested therebetween, threaded means positioned between said vertically extending flanges for moving said movable member toward or from said anvil, an indentation member carried by said movable member and means for moving said indentation member into engagement with an object positioned between said anvil and said movable member.

4. In combination, a stationary member, said stationary member being of I-cross-section and providing a pair of vertically extending machined planar faces, said member being provided with an extending anvil, a movable member positioned on said stationary member and having machined surfaces in sliding abutment with said planar faces, threaded means for moving said movable member relative to said extending anvil for gripping material to be tested therebetween, an indentation member carried by said movable member and means for moving said indentation member against said material being tested.

5. A hardness tester comprising a stationary member, said stationary member being of I-cross section and providing a pair of vertically machined planar faces, a movable member positioned on said stationary member and having machined surfaces for sliding abutment with said planar faces, threaded means for moving said movable member, indentation means carried by said movable member and means for moving said indentation means against material to be tested.

6. A hardness testing device comprising in combination, a stationary member having opposed spaced parallel and vertically extending flanges joined by an integral web, said stationary member having an extending end, a movable member slidably retained on said vertically extending flanges and having a work engaging portion movable toward and away from said extending end for gripping material therebetween, threaded means positioned between said vertically extended flanges for moving said movable member, an indentation member carried by said movable member for engagement with an object positioned between said movable member and extending end, means for retracting and extending said indentatiotn member comprising a first piston connected to actuator means and a second piston positioned directly below said first piston carrying said indentation member and movable in response to said actuator means and said first piston.

References Cited in the file of this patent

UNITED STATES PATENTS

| | | |
|---|---|---|
| 499,739 | Hunt | June 20, 1893 |
| 1,770,046 | Shore | July 8, 1930 |
| 2,109,521 | Ballentine | Mar. 1, 1938 |
| 2,277,256 | Pfauser | Mar. 24, 1942 |
| 2,297,778 | Knerr et al. | Oct. 6, 1942 |
| 2,361,441 | Wilson | Oct. 31, 1944 |
| 2,375,341 | Bishop et al. | May 8, 1945 |
| 2,382,797 | Langan | Aug. 14, 1945 |
| 2,436,435 | Kent | Feb. 24, 1948 |
| 2,522,307 | Shaff | Sept. 12, 1950 |
| 2,536,880 | James | Jan. 2, 1951 |
| 2,643,545 | More | June 30, 1953 |
| 2,652,718 | Wiseman | Sept. 22, 1953 |
| 2,674,874 | Jones | Apr. 13, 1954 |
| 2,685,197 | Mennesson | Aug. 3, 1954 |